(12) United States Patent
Yan et al.

(10) Patent No.: US 11,467,381 B2
(45) Date of Patent: Oct. 11, 2022

(54) CAMERA OPTICAL LENS

(71) Applicant: AAC Optics Solutions Pte. Ltd., Singapore (SG)

(72) Inventors: Junjie Yan, Shenzhen (CN); Wen Sun, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 287 days.

(21) Appl. No.: 16/989,926

(22) Filed: Aug. 11, 2020

(65) Prior Publication Data

US 2021/0055521 A1 Feb. 25, 2021

(30) Foreign Application Priority Data

Aug. 19, 2019 (CN) .......................... 201910764607.X

(51) Int. Cl.
| | | |
|---|---|---|
| *G02B 9/60* | (2006.01) | |
| *G02B 13/00* | (2006.01) | |
| *G02B 7/02* | (2021.01) | |
| *G02B 13/18* | (2006.01) | |
| *G02B 27/00* | (2006.01) | |
| *G02B 5/00* | (2006.01) | |

(52) U.S. Cl.
CPC .......... *G02B 13/0045* (2013.01); *G02B 7/021* (2013.01); *G02B 13/18* (2013.01); *G02B 27/0025* (2013.01); *G02B 5/005* (2013.01); *G02B 9/60* (2013.01)

(58) Field of Classification Search
CPC .............. G02B 13/0045; G02B 7/021; G02B 27/0025; G02B 13/18; G02B 5/005; G02B 9/60

USPC ................ 359/708, 713, 739, 740, 754, 755
See application file for complete search history.

(56) References Cited

U.S. PATENT DOCUMENTS

| | | | | |
|---|---|---|---|---|
| 4,217,034 A | * | 8/1980 | Sugiyama | G02B 13/04 359/754 |
| 9,030,757 B2 | * | 5/2015 | Kawamura | G02B 13/04 359/708 |
| 10,330,892 B2 | * | 6/2019 | Hashimoto | G02B 13/0045 |
| 10,705,319 B2 | * | 7/2020 | Jhang | G02B 9/64 |
| 10,725,269 B2 | * | 7/2020 | Hsieh | G02B 9/64 |
| 10,746,971 B2 | * | 8/2020 | Hashimoto | G02B 9/64 |
| 11,340,430 B2 | * | 5/2022 | Chen | G02B 13/0045 |

(Continued)

FOREIGN PATENT DOCUMENTS

CN 110687659 B * 4/2022 ............. G02B 13/18

*Primary Examiner* — Evelyn A Lester
(74) *Attorney, Agent, or Firm* — W&G Law Group

(57) ABSTRACT

The present invention provides a camera optical lens including, from an object side to an image side, a first lens having a positive refractive power, a second lens having a negative refractive power, a third lens, a fourth lens having a positive refractive power, a fifth lens having a negative refractive power, a sixth lens having a negative refractive power, a seventh lens having a positive refractive power and a eighth lens having a negative refractive power. The camera optical lens satisfies the following conditions: $0.65 \leq f1/f \leq 0.85$, $2.00 \leq f4/f \leq 5.00$, and $-5.50 \leq f5/f \leq -2.50$; where f, f1, f4 and f5 respectively denote a focal length of the camera optical lens, the first lens, the fourth lens and the fifth lens. The camera optical lens in the present disclosure has characteristics of large aperture, wide angle and ultra-thinness while having good optical functions.

11 Claims, 9 Drawing Sheets

(56) References Cited

U.S. PATENT DOCUMENTS

| | | | |
|---|---|---|---|
| 11,372,210 B2* | 6/2022 | Jhang | G02B 9/64 |
| 2013/0271851 A1* | 10/2013 | Souma | G02B 3/04 |
| | | | 359/708 |
| 2014/0240851 A1* | 8/2014 | Kawamura | G02B 9/64 |
| | | | 359/708 |
| 2014/0268367 A1* | 9/2014 | Kawamura | G02B 13/18 |
| | | | 359/708 |
| 2018/0074299 A1* | 3/2018 | Huang | G02B 13/0045 |
| 2019/0121098 A1* | 4/2019 | Zhou | G02B 13/0045 |
| 2019/0204558 A1* | 7/2019 | Jhang | G02B 13/0045 |
| 2019/0204559 A1* | 7/2019 | Jhang | G02B 13/06 |
| 2019/0204560 A1* | 7/2019 | Jhang | G02B 9/64 |
| 2019/0310444 A1* | 10/2019 | Hashimoto | G02B 13/0045 |
| 2019/0310445 A1* | 10/2019 | Hashimoto | G02B 13/0045 |
| 2019/0310446 A1* | 10/2019 | Hashimoto | G02B 13/0045 |
| 2019/0310447 A1* | 10/2019 | Hashimoto | G02B 9/64 |
| 2019/0310448 A1* | 10/2019 | Hashimoto | G02B 13/0045 |
| 2020/0110247 A1* | 4/2020 | Jhang | G02B 13/18 |
| 2020/0174227 A1* | 6/2020 | Nitta | G02B 13/0045 |
| 2020/0249439 A1* | 8/2020 | Song | G02B 27/0025 |

\* cited by examiner

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

Smart phones are developing and getting popularized fast, and development and design of cameras follow. As the current development trend of electronic products goes towards better functions and thinner and smaller dimensions, miniature camera lenses with good imaging quality is becoming a mainstream in the market.

In order to obtain better imaging quality, a mini-lens that is traditionally equipped in a mobile phone camera adopts a three-piece or four-piece and even five-piece or six-piece lens structure. Although a lens as such has good optical functions, the lens is fairly unreasonable in terms of setting of focal length, rendering that the lens structure with good optical functions can not satisfy a design requirement of large aperture, ultra-thinness and wide angle.

SUMMARY

To address the above issues, the present disclosure seeks to provide a camera optical lens that satisfies a design requirement of large aperture, ultra-thinness and wide angle while having good optical functions.

The technical solutions of the present disclosure are as follows:

A camera optical lens comprising, from an object side to an image side: a first lens having a positive refractive power; a second lens having a negative refractive power; a third lens; a fourth lens having a positive refractive power; a fifth lens having a negative refractive power; a sixth lens having a negative refractive power; a seventh lens having a positive refractive power; and a eighth lens having a negative refractive power; wherein the camera optical lens satisfies following conditions:

$0.65 \leq f1/f \leq 0.85$;

$2.00 \leq f4/f \leq 5.00$; and $-5.50 \leq f5/f \leq -2.50$;

where f denotes a focal length of the camera optical lens; f1 denotes a focal length of the first lens; f4 denotes a focal length of the fourth lens; and f5 denotes a focal length of the fifth lens.

As an improvement, the camera optical lens further satisfies the following condition:

$-50.00 \leq (R13+R14)/(R13-R14) \leq -1.00$;

where R13 denotes a curvature radius of an object-side surface of the seventh lens; and R14 denotes a curvature radius of an image-side surface of the seventh lens.

As an improvement, the camera optical lens further satisfies the following condition:

$1.50 \leq d10/d9 \leq 2.50$;

where d9 denotes an on-axis thickness of the fifth lens; and d10 denotes an on-axis distance from an image-side surface of the fifth lens to an object-side surface of the sixth lens.

As an improvement, the camera optical lens further satisfies the following conditions:

$0.07 \leq d1/TTL \leq 0.21$; and $-3.97 \leq (R1+R2)/(R1-R2) \leq -0.78$;

where d1 denotes an on-axis thickness of the first lens; TTL denotes a total optical length from an object-side surface of the first lens to an image surface of the camera optical lens along an optical axis; R1 denotes a curvature radius of an object-side surface of the first lens; and R2 denotes a curvature radius of an image-side surface of the first lens.

As an improvement, the camera optical lens further satisfies the following conditions:

$0.02 \leq d3/TTL \leq 0.05$;

$0.64 \leq (R3+R4)/(R3-R4) \leq 6.98$; and $-5.71 \leq f2/f \leq -0.97$;

where f2 denotes a focal length of the second lens; d3 denotes an on-axis thickness of the second lens; TTL denotes a total optical length from an object-side surface of the first lens to an image surface of the camera optical lens along the optical axis; R3 denotes a curvature radius of an object-side surface of the second lens; and R4 denotes a curvature radius of an image-side surface of the second lens.

As an improvement, the camera optical lens further satisfies the following conditions:

$0.02 \leq d5/TTL \leq 0.06$;

$-2.74 \leq (R5+R6)/(R5-R6) \leq 2.64$; and $-36.14 \leq f3/f \leq 7.89$;

where f3 denotes a focal length of the third lens; d5 denotes an on-axis thickness of the third lens; TTL denotes a total optical length from an object-side surface of the first lens to an image surface of the camera optical lens along the optical axis; R5 denotes a curvature radius of an object-side surface of the third lens; and R6 denotes a curvature radius of an image-side surface of the third lens.

As an improvement, the camera optical lens further satisfies the following conditions:

$0.02 \leq d7/TTL \leq 0.07$; and $-0.86 \leq (R7+R8)/(R7-R8) \leq 9.27$;

where d7 denotes an on-axis thickness of the fourth lens; TTL denotes a total optical length from an object-side surface of the first lens to an image surface of the camera optical lens along an optical axis; R7 denotes a curvature radius of an object-side surface of the fourth lens; and R8 denotes a curvature radius of an image-side surface of the fourth lens.

As an improvement, the camera optical lens further satisfies the following conditions:

$0.02 \leq d9/TTL \leq 0.05$; and $-3.80 \leq (R9+R10)/(R9-R10) \leq 40.40$;

where d9 denotes an on-axis thickness of the fifth lens; TTL denotes a total optical length from an object-side surface of the first lens to an image surface of the camera optical lens along an optical axis; R9 denotes a curvature radius of an object-side surface of the fifth lens; and R10 denotes a curvature radius of an image-side surface of the fifth lens.

As an improvement, the camera optical lens further satisfies the following conditions:

$$0.03 \leq d11/TTL \leq 0.08;$$

$$-11.91 \leq (R11+R12)/(R11-R12) \leq -1.27; \text{ and}$$

$$-12.80 \leq f6/f \leq -1.61;$$

where f6 denotes a focal length of the sixth lens; d11 denotes an on-axis thickness of the sixth lens; TTL denotes a total optical length from an object-side surface of the first lens to an image surface of the camera optical lens along an optical axis; R11 denotes a curvature radius of an object-side surface of the sixth lens; and R12 denotes a curvature radius of an image-side surface of the sixth lens.

As an improvement, the camera optical lens further satisfies the following conditions:

$$0.03 \leq d13/TTL \leq 0.11; \text{ and}$$

$$0.54 \leq f7/f \leq 2.38;$$

where f7 denotes a focal length of the seventh lens; d13 denotes an on-axis thickness of the seventh lens; and TTL denotes a total optical length from an object-side surface of the first lens to an image surface of the camera optical lens along an optical axis.

As an improvement, the camera optical lens further satisfies the following conditions:

$$0.03 \leq d15/TTL \leq 0.13;$$

$$-1.53 \leq (R15+R16)/(R15-R16) \leq -0.23; \text{ and}$$

$$-1.63 \leq f8/f \leq -0.46;$$

where f8 denotes a focal length of the eighth lens; d15 denotes an on-axis thickness of the eighth lens; TTL denotes a total optical length from an object-side surface of the first lens to an image surface of the camera optical lens along an optical axis; R15 denotes a curvature radius of an object-side surface of the eighth lens; and R16 denotes a curvature radius of an image-side surface of the eighth lens.

The present disclosure is advantageous in: through the above lens configuration, the camera optical lens in the present disclosure has good optical functions and has characteristics of large aperture, wide angle and ultra-thinness, and is especially fit for WEB camera lenses and mobile phone camera lens assemblies composed by such camera elements as CCD and CMOS for high pixels.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
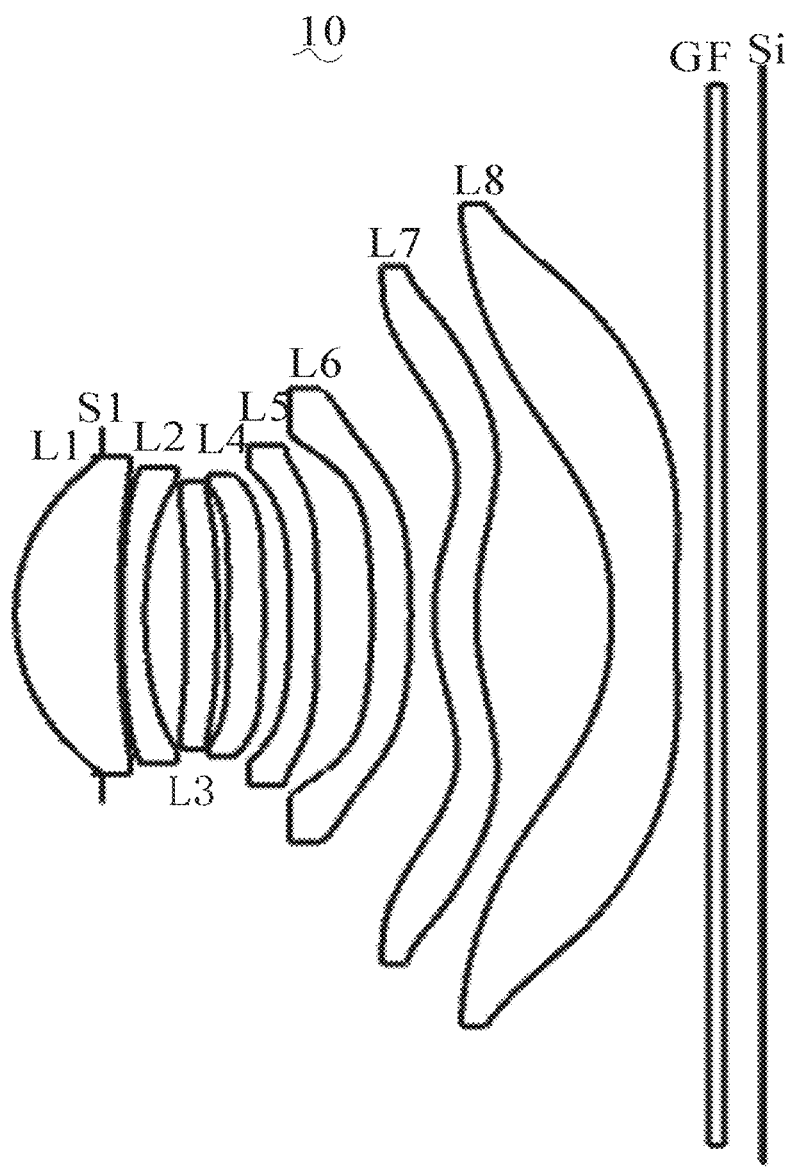
FIG. 1 is a schematic diagram of a structure of a camera optical lens according to Embodiment 1 of the present disclosure.

FIG. 1 shows the camera optical lens 10 of Embodiment 1 of the present disclosure, and the camera optical lens 10 includes eight lenses. Specifically, the camera optical lens 10 includes, from an object side to an image side: an aperture S1, a first lens L1, a second lens L2, a third lens L3, a fourth lens L4, a fifth lens L5, a sixth lens L6, a seventh lens L7 and a eighth lens L8. In this embodiment, an optical element such as an optical filter GF is arranged between the eighth lens L8 and an image surface Si. Herein, the optical filter GF may either be a glass cover plate or be an optical filter. Alternatively, the optical filter GF may further be arranged at another position in another embodiment.

In this embodiment, the first lens L1 has a positive refractive power, the second lens L2 has a negative refractive power, the fourth lens L1 has a positive refractive power, the fifth lens L5 has a negative refractive power, the sixth lens L6 has a negative refractive, the seventh lens L7 has a positive refractive power and the eighth lens has a negative refractive power.

Here, a focal length of the camera optical lens 10 is defined as f and a focal length unit is mm. A focal length of the first lens L1 is defined as f1, a focal length of the fourth lens L4 is defined as f4, and a focal length of the fifth lens L5 is defined as f5. f, f1, f4 and f5 satisfy the following conditions:

$$0.65 \leq f1/f \leq 0.85 \tag{1}$$

$$2.00 \leq f4/f \leq 5.00 \tag{2}$$

$$-5.50 \leq f5/f \leq -2.50 \tag{3}$$

Herein, condition (1) specifies a ratio between the focal length of the first lens L1 and the focal length of the camera optical lens 10, within a range of which it helps realize the ultra-thinness of the camera optical lens.

Condition (2) specifies a ratio between the focal length of the fourth lens L4 and the focal length of the camera optical lens 10, within a range of which it helps improve functions of the camera optical lens.

Condition (3) specifies a ratio between the focal length of the fifth lens L5 and the focal length of the camera optical lens 10, within a range of which the focal length of the fifth lens L5 may be effectively allocated, thereby helping correct aberration and improving imaging quality.

In this embodiment, through a configuration of the lens as above, by using each of the lenses (L1, L2, L3, L4, L5 and L6) with different refractive powers, and by setting a ratio between the focal length of the first lens L1 and the focal length of the camera optical lens 10, a ratio between the focal length of the fourth lens L4 and the focal length of the camera optical lens 10, and a ratio between the focal length of the fifth lens L5 and the focal length of the camera optical lens 10, it helps improve functions of the camera optical lens 10 and satisfy a design requirement of large aperture, ultra-thinness and wide angle.

Preferably, a curvature radius of an object-side surface of the seventh lens L7 is defined as R13, a curvature radius of an image-side surface of the seventh lens L7 is defined as R14 and the camera optical lens 10 satisfies the following condition:

$$-50.00 \leq (R13+R14)/(R13-R14) \leq -1.00 \quad (4)$$

Condition (4) specifies a shape of the first lens L1, within a range of which it helps alleviate refraction of light when passing through the lens, thereby effectively reducing aberration.

Preferably, an on-axis thickness of the fifth lens L5 is defined as d9, an on-axis distance from an image-side surface of the fifth lens L5 to an object-side surface of the sixth lens L6 is defined as d10, and the camera optical lens 10 satisfies the following condition:

$$1.50 \leq d10/d9 \leq 2.50 \quad (5)$$

Condition (5) specifies a ratio between an air separation distance between the fifth lens L5 and the sixth lens L6 and the thickness of the fifth lens L5, within a range of which it contributes to lens processing and the assembly of the camera optical lens.

Preferably, an on-axis thickness of the first lens L1 is defined as d1, the total optical length from an object-side surface of the first lens L1 to an image surface Si of the camera optical lens 10 along an optical axis is defined as TTL, a curvature radius of the object-side surface of the first lens L1 is defined as R1, a curvature radius of an image-side surface of the first lens L1 is defined as R2 and the camera optical lens 10 satisfies the following conditions:

$$0.07 \leq d1/TTL \leq 0.21 \quad (6)$$

$$-30.97 \leq (R1+R2)/(R1-R2) \leq -0.78 \quad (7)$$

Condition (6) specifies a ratio between the on-axis thickness of the first lens L1 and the total optical length from the object-side surface of the first lens L1 to the image surface Si of the camera optical lens 10 along the optical axis, which facilitates realizing ultra-thinness.

Condition (7) specifies a shape of the first lens L1, within a range of which it helps correct the spherical aberration of the camera optical lens.

Preferably, a focal length of the second lens L2 is defined as f2, an on-axis thickness of the second lens L2 is defined as d3, the total optical length from the object-side surface of the first lens L1 to the image surface Si of the camera optical lens 10 along the optical axis is defined as TTL, a curvature radius of an object-side surface of the second lens L2 is defined as R3, a curvature radius of an image-side surface of the second lens L2 is defined as R4, and the camera optical lens 10 satisfies the following conditions:

$$0.02 \leq d3/TTL \leq 0.05 \quad (8)$$

$$0.64 \leq (R3+R4)/(R3-R4) \leq 6.98 \quad (9)$$

$$-5.71 \leq f2/f \leq -0.97 \quad (10)$$

Condition (8) specifies a ratio between the on-axis thickness of the second lens L2 and the total optical length from the object-side surface of the first lens L1 to the image surface Si of the camera optical lens 10 along the optical axis, which facilitates realizing ultra-thinness.

Condition (9) specifies a shape of the second lens L2, within a range of which it helps correct the off-axis aberration with the development towards ultra-thin and wide-angle lens.

Condition (10) specifies a ratio between the focal length of the second lens L2 and the focal length of the camera optical lens 10, within a range of which and by controlling the negative focal power of the second lens L2 in a reasonable range, it helps correct aberration of the camera optical lens 10.

Preferably, a focal length of the fifth lens L5 is defined as f5, an on-axis thickness of the fifth lens L5 is defined as d9, the total optical length from the object-side surface of the first lens L1 to the image surface Si of the camera optical lens 10 along the optical axis is defined as TTL, a curvature radius of an object-side surface of the third lens L3 is defined as R5, a curvature radius of an image-side surface of the third lens L3 is defined as R6, and the camera optical lens 10 satisfies the following conditions:

$$0.02 \leq d5/TTL \leq 0.06 \quad (11)$$

$$-2.74 \leq (R5+R6)/(R5-R6) \leq 2.64 \quad (12)$$

$$-36.14 \leq f3/f \leq 7.89 \quad (13)$$

Condition (11) specifies a ratio between the on-axis thickness of the third lens L3 and the total optical length from the object-side surface of the first lens L 1 to the image surface Si of the camera optical lens 10 along the optical axis, which facilitates realizing ultra-thinness.

Condition (12) specifies a shape of the third lens L3, within a range of which it facilitates the formation of the third lens L3, and may avoid forming defects and stress caused by excessive surface curvature of the third lens L3.

Condition (13) specifies a ratio between the focal length of the third lens L3 and the focal length of the camera optical lens 10, within a range of which and through a reasonable distribution in focal length, the camera optical lens 10 has better imaging quality and lower sensitivity.

Preferably, an on-axis thickness of the fourth lens L4 is defined as d7, the total optical length from the object-side surface of the first lens L1 to the image surface Si of the camera optical lens 10 along the optical axis is defined as TTL, a curvature radius of an object-side surface of the fourth lens L4 is defined as R7, a curvature radius of an image-side surface of the fourth lens L4 is defined as R8, and the camera optical lens 10 satisfies the following conditions:

$$0.02 \leq d7/TTL \leq 0.07 \quad (14)$$

$$-0.86 \leq (R7+R8)/(R7-R8) \leq 9.27 \quad (15)$$

Condition (14) specifies a ratio between the on-axis thickness of the fourth lens L4 and the total optical length from the object-side surface of the first lens L1 to the image surface Si of the camera optical lens 10 along the optical axis, which facilitates realizing ultra-thinness.

Condition (15) specifies a shape of the fourth lens L4, within a range of which it helps correct the off-axis aberration with the development towards ultra-thin and wide-angle lens.

Preferably, an on-axis thickness of the fifth lens L5 is defined as d9, the total optical length from the object-side surface of the first lens L1 to the image surface Si of the camera optical lens 10 along the optical axis is defined as TTL, a curvature radius of an object-side surface of the fifth lens L5 is defined as R9, a curvature radius of an image-side surface of the fifth lens L5 is defined as R10, and the camera optical lens 10 satisfies the following conditions:

$$0.02 \leq d9/TTL \leq 0.05 \quad (16)$$

$$-3.80 \leq (R9+R10)/(R9-R10) \leq 4.40 \quad (17)$$

Condition (16) specifies a ratio between the on-axis thickness of the fifth lens L5 and the total optical length from the object-side surface of the first lens L1 to the image surface Si of the camera optical lens 10 along the optical axis, which facilitates realizing ultra-thinness.

Condition (17) specifies a shape of the fifth lens L5, within a range of which it helps correct the off-axis aberration with the development towards ultra-thin and wide-angle lens.

Preferably, a focal length of the sixth lens L6 is defined as f6, an on-axis thickness of the sixth lens L6 is defined as d11, the total optical length from the object-side surface of the first lens L1 to the image surface Si of the camera optical lens 10 along the optical axis is defined as TTL, a curvature radius of the object-side surface of the sixth lens L6 is defined as R11, a curvature radius of an image-side surface of the sixth lens L6 is defined as R12, and the camera optical lens 10 satisfies the following conditions:

$$0.03 \leq d11/TTL \leq 0.08 \quad (18)$$

$$-11.91 \leq (R11+R12)/(R11-R12) \leq -1.27 \quad (19)$$

$$-12.80 \leq f6/fs \leq -1.61 \quad (20)$$

Condition (18) specifies a ratio between the on-axis thickness of the sixth lens L6 and the total optical length from the object-side surface of the first lens L1 to the image surface Si of the camera optical lens 10 along the optical axis, which facilitates realizing ultra-thinness.

Condition (19) specifies a shape of the sixth lens L6, within a range of which it helps correct the off-axis aberration with the development towards ultra-thin and wide-angle lens.

Condition (20) specifies a ratio between the focal length of the sixth lens L6 and the focal length of the camera optical lens 10, through which and a reasonable distribution in focal length, the camera optical lens 10 has better imaging quality and lower sensitivity.

Preferably, a focal length of the seventh lens L7 is defined as f7, an on-axis thickness of the seventh lens L7 is defined as d13, the total optical length from the object-side surface of the first lens L1 to the image surface Si of the camera optical lens 10 along the optical axis is defined as TTL, and the camera optical lens 10 satisfies the following conditions:

$$0.03 \leq d13/TTL \leq 0.11 \quad (21)$$

$$0.54 \leq f7/fs \leq 2.38 \quad (22)$$

Condition (21) specifies a ratio between the on-axis thickness of the seventh lens L7 and the total optical length from the object-side surface of the first lens L1 to the image surface Si of the camera optical lens 10 along the optical axis, which facilitates realizing ultra-thinness.

Condition (22) specifies a ratio between the focal length of the seventh lens L7 and the focal length of the camera optical lens 10, through which and a reasonable distribution in focal length, the camera optical lens 10 has better imaging quality and lower sensitivity.

Preferably, a focal length of the eighth lens L8 is defined as f8, an on-axis thickness of the eighth lens L8 is defined as d15, the total optical length from the object-side surface of the first lens L1 to the image surface Si of the camera optical lens 10 along the optical axis is defined as TTL, a curvature radius of an object-side surface of the eighth lens L8 is defined as R15, a curvature radius of an image-side surface of the eighth lens L8 is defined as R16, and the camera optical lens 10 satisfies the following conditions:

$$0.03 \leq d15/TTL \leq 0.13 \quad (23)$$

$$-1.53 \leq (R15+R16)/(R15-R16) \leq -0.23 \quad (24)$$

$$-1.63 \leq f8/fs \leq -0.46 \quad (25)$$

Condition (23) specifies a ratio between the on-axis thickness of the eighth lens L8 and the total optical length from the object-side surface of the first lens L1 to the image surface Si of the camera optical lens 10 along the optical axis, which facilitates realizing ultra-thinness.

Condition (24) specifies a shape of the eighth lens L8, within a range of which it helps correct the off-axis aberration with the development towards ultra-thin and wide-angle lens.

Condition (25) specifies a ratio between the focal length of the eighth lens L8 and the focal length of the camera optical lens 10, through which and a reasonable distribution in focal length, the camera optical lens 10 has better imaging quality and lower sensitivity.

In this embodiment, the total optical length from the object-side surface of the first lens L1 to the image surface Si of the camera optical lens 10 along the optical axis is defined as TTL, an image height of the camera optical lens 10 is IH, and the camera optical lens 10 satisfies the following conditions: TTL/IH≤1.25 and FNO≤1.95, FOV≤80, which satisfies the requirement of large aperture and ultra-thinness.

In addition, the surface of the lens may be set as an aspheric surface, which may be easily made into a shape beyond the sphere to obtain more control variables to reduce aberration and thus reduce the number of lenses used. Therefore, the total optical length from the object-side surface of the first lens L1 to the image surface Si of the camera optical lens 10 along the optical axis of the present disclosure may be effectively reduced. In the embodiment of the present disclosure, the object-side surface and image-side surface of each lens are aspheric surfaces.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

Preferably, inflexion points and/or arrest points can be arranged on the object-side surface and/or the image-side surface of the lens, so as to satisfy the demand for high quality imaging. The description below can be referred for specific implementations.

FIG. 1 is a schematic diagram of a structure of the camera optical lens 10 according to Embodiment 1 of the present disclosure. The design data of the camera optical lens 10 in Embodiment 1 of the present disclosure are shown in the following.

Table 1 lists object-side and image-side curvature radiuses R, on-axis thicknesses of lenses, distance d between lenses, refraction indexes nd and abbe numbers vd of the first to sixth lenses L1 to L6 that forms the camera optical lens 10 in Embodiment 1 of the present disclosure. Table 2 lists conic coefficient k and aspheric surface coefficients of the camera optical lens 10. It shall be noted that in this embodiment, units of distance, radius and thickness are millimeter (mm).

TABLE 1

| | R | d | nd | vd |
|---|---|---|---|---|
| S1 | ∞ | d0 = −1.121 | | |
| R1 | 2.979 | d1 = 1.345 | nd1 1.5450 | v1 55.81 |
| R2 | 13.451 | d2 = 0.039 | | |
| R3 | 11.794 | d3 = 0.300 | nd2 1.6700 | v2 19.39 |
| R4 | 6.043 | d4 = 0.526 | | |
| R5 | −83.564 | d5 = 0.412 | nd3 1.6037 | v3 28.10 |
| R6 | −534.209 | d6 = 0.140 | | |
| R7 | 50.676 | d7 = 0.470 | nd4 1.5975 | v4 29.62 |
| R8 | −22.223 | d8 = 0.338 | | |
| R9 | −13.841 | d9 = 0.353 | nd5 1.6700 | v5 19.39 |
| R10 | −44.530 | d10 = 0.714 | | |
| R11 | −8.140 | d11 = 0.500 | nd6 1.6011 | v6 28.67 |
| R12 | −11.424 | d12 = 0.307 | | |
| R13 | 3.309 | d13 = 0.550 | nd7 1.5571 | v7 45.68 |
| R14 | 5.298 | d14 = 1.760 | | |
| R15 | −5.512 | d15 = 0.837 | nd8 1.5352 | v8 55.86 |
| R16 | 14.818 | d16 = 0.431 | | |
| R17 | ∞ | d17 = 0.210 | ndg 1.5168 | vg 64.17 |
| R18 | ∞ | d18 = 0.484 | | |

In the table, meanings of various symbols will be described as follows.

R: curvature radius of an optical surface;

S1: aperture;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of the object-side surface of the seventh lens L7;

R14: curvature radius of the image-side surface of the seventh lens L7;

R15: curvature radius of the object-side surface of the eighth lens L8;

R16: curvature radius of the image-side surface of the eighth lens L8;

R17: curvature radius of an object-side surface of the optical filter GF;

R18: curvature radius of an image-side surface of the optical filter GF;

d: on-axis thickness of a lens and an on-axis distance between lens;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the eighth lens L8;

d15: on-axis thickness of the eighth lens L8;

d16: on-axis distance from the image-side surface of the eighth lens L8 to the object-side surface of the optical filter GF;

d17: on-axis thickness of the optical filter GF;

d18: on-axis distance from the image-side surface to the image surface Si of the optical filter GF;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

nd8: refractive index of the d line of the eighth lens L8;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the sixth lens L7;

v8: abbe number of the sixth lens L8;

vg: abbe number of the optical filter GF.

TABLE 2

| | Conic coefficient | Aspheric surface coefficients | | | |
|---|---|---|---|---|---|
| | k | A4 | A6 | A8 | A10 |
| R1 | −8.3053E−03 | −5.7548E−03 | 1.2302E−02 | −1.3367E−02 | 8.7405E−03 |
| R2 | −1.2971E+00 | −1.2600E−02 | 3.1416E−03 | 6.0972E−03 | −6.4170E−03 |
| R3 | 6.1047E+00 | −1.6869E−02 | 7.9182E−03 | 3.7470E−03 | −6.0469E−03 |
| R4 | −1.3534E+01 | −1.0371E−03 | 1.6299E−02 | −2.1569E−02 | 2.1488E−02 |
| R5 | 0.0000E+00 | −1.0400E−02 | 9.5062E−04 | −3.2289E−03 | 8.5299E−03 |
| R6 | 2.2035E+02 | −2.5125E−02 | 1.2019E−02 | −1.8993E−02 | 2.4901E−02 |
| R7 | 3.0097E+02 | −1.0746E−02 | −1.3909E−02 | 1.2767E−02 | −3.5467E−03 |
| R8 | −6.7360E+02 | 2.8383E−03 | −2.8373E−02 | 3.8486E−02 | −3.3109E−02 |
| R9 | 0.0000E+00 | 1.2540E−02 | −4.0383E−02 | 3.7026E−02 | −2.3464E−02 |
| R10 | 9.7397E+01 | 8.2233E−03 | −2.3036E−02 | 1.2554E−02 | −3.8558E−03 |
| R11 | 6.3258E+00 | 2.9072E−02 | −1.8960E−02 | 4.9455E−03 | −4.9613E−04 |
| R12 | 9.7634E+00 | 3.5013E−03 | −7.2323E−03 | 1.7785E−03 | −1.4572E−04 |
| R13 | −6.4600E+00 | −2.2164E−03 | −2.6647E−03 | 2.1966E−04 | 1.6399E−05 |
| R14 | −2.0909E+01 | 1.4651E−02 | −6.8841E−03 | 1.1844E−03 | −1.2542E−04 |
| R15 | −2.2921E+01 | −2.5988E−02 | 4.4789E−03 | −4.6249E−04 | 3.2517E−05 |
| R16 | −1.4928E+01 | −1.2884E−02 | 9.8947E−04 | −2.2163E−06 | −8.0874E−06 |

| | Aspheric surface coefficients | | | | |
|---|---|---|---|---|---|
| | A12 | A14 | A16 | A18 | A20 |
| R1 | −3.5757E−03 | 9.2406E−04 | −1.4661E−04 | 1.3047E−05 | −5.0002E−07 |
| R2 | 3.1366E−03 | −9.0613E−04 | 1.5783E−04 | −1.5336E−05 | 6.3647E−07 |
| R3 | 3.4421E−03 | −1.1183E−03 | 2.1716E−04 | −2.3352E−05 | 1.0628E−06 |
| R4 | −1.4347E−02 | 6.1771E−03 | −1.6412E−03 | 2.4481E−04 | −1.5654E−05 |
| R5 | −8.5902E−03 | 4.5734E−03 | −1.3727E−03 | 2.2149E−04 | −1.4959E−05 |
| R6 | −1.9208E−02 | 8.8079E−03 | −2.3864E−03 | 3.5545E−04 | −2.2462E−05 |
| R7 | −2.6572E−03 | 2.5435E−03 | −9.1266E−04 | 1.6072E−04 | −1.1536E−05 |
| R8 | 1.8163E−02 | −6.4536E−03 | 1.4196E−03 | −1.7399E−04 | 9.0207E−06 |
| R9 | 1.0695E−02 | −3.4259E−03 | 7.0365E−04 | −8.0891E−05 | 3.9051E−06 |
| R10 | 6.3647E−04 | −4.5313E−05 | −1.0266E−06 | 3.9879E−07 | −2.1074E−08 |
| R11 | −2.1969E−04 | 1.0532E−04 | −2.0517E−05 | 1.9801E−06 | −7.5953E−08 |
| R12 | −4.8105E−05 | 1.7139E−05 | −2.2274E−06 | 1.3369E−07 | −3.0965E−09 |
| R13 | −3.7553E−06 | 2.7398E−07 | −1.0415E−08 | 2.0828E−10 | −1.7399E−12 |
| R14 | 8.7398E−06 | −3.9281E−07 | 1.0733E−08 | −1.5890E−10 | 9.5460E−13 |
| R15 | −1.5360E−06 | 4.7092E−08 | −8.8893E−10 | 9.3155E−12 | −4.1197E−14 |
| R16 | 8.3080E−07 | −4.1544E−08 | 1.1472E−09 | −1.6667E−11 | 9.9371E−14 |

In Table 2, k is a conic coefficient, and A4, A6, A8, A10, A12, A14, A16, A18 and A20 are aspheric surface coefficients.

It shall be noted that the non-spheres in each lens in this embodiment are ones represented by the following formula (26), but a specific form of the following formula (26) is only one example. Practically, the present disclosure is not limited to this formula.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (26)$$

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, P7R1 and P7R2 represent the object-side surface and the image-side surface of the seventh lens L7, and P8R1 and P8R2 represent the object-side surface and the image-side surface of the eighth lens L8. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 2.295 | | |
| P1R2 | 1 | 1.965 | | |
| P2R1 | 1 | 2.085 | | |
| P2R2 | 1 | 1.885 | | |
| P3R1 | 2 | 1.485 | 1.895 | |
| P3R2 | 1 | 1.575 | | |
| P4R1 | 1 | 0.355 | | |
| P4R2 | | | | |
| P5R1 | | | | |
| P5R2 | 1 | 2.125 | | |
| P6R1 | 1 | 2.445 | | |
| P6R2 | 2 | 2.425 | 2.915 | |
| P7R1 | 3 | 1.155 | 3.435 | 4.835 |
| P7R2 | 3 | 1.325 | 4.555 | 5.065 |
| P8R1 | 3 | 2.755 | 5.695 | 5.965 |
| P8R2 | 2 | 0.685 | 5.145 | |

TABLE 4

| | Number(s) of arrest points | Arrest point position 1 | Arrest point position 2 |
|---|---|---|---|
| P1R1 | | | |
| P1R2 | | | |
| P2R1 | | | |
| P2R2 | | | |
| P3R1 | 2 | 1.755 | 1.945 |
| P3R2 | 1 | 1.855 | |
| P4R1 | 1 | 0.575 | |
| P4R2 | | | |
| P5R1 | | | |
| P5R2 | | | |
| P6R1 | | | |
| P6R2 | | | |
| P7R1 | 1 | 2.015 | |
| P7R2 | 1 | 2.255 | |
| P8R1 | | | |
| P8R2 | 1 | 1.225 | |

In addition, Table 13 in the following shows various values of Embodiments 1 and values corresponding to parameters which are specified in the above conditions.

Figure 2:
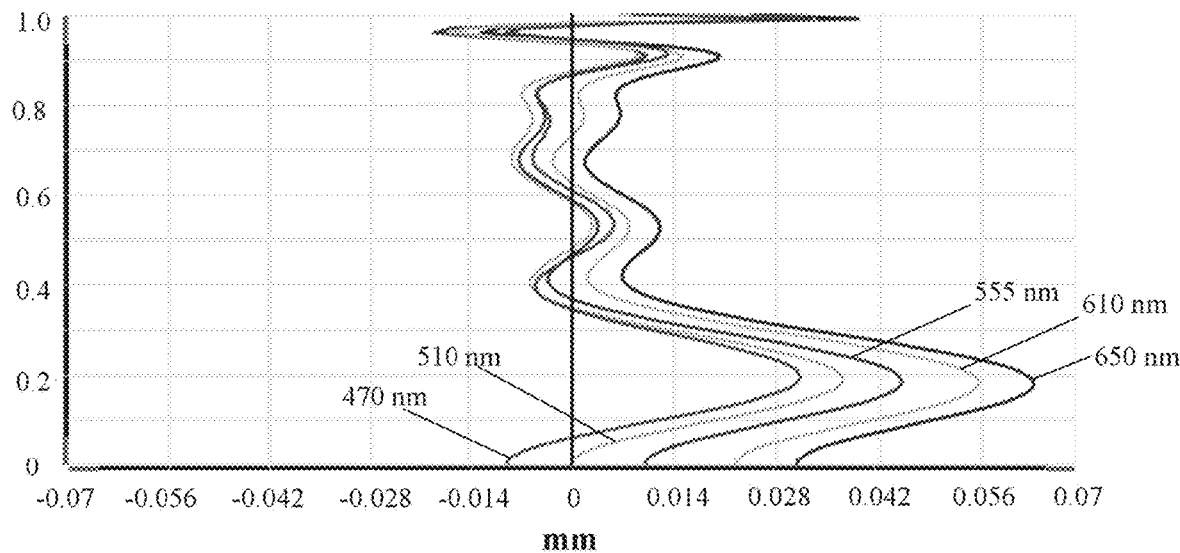
FIG. 2 is a schematic diagram of a longitudinal aberration of the camera optical lens shown in FIG. 1.
Figure 3:
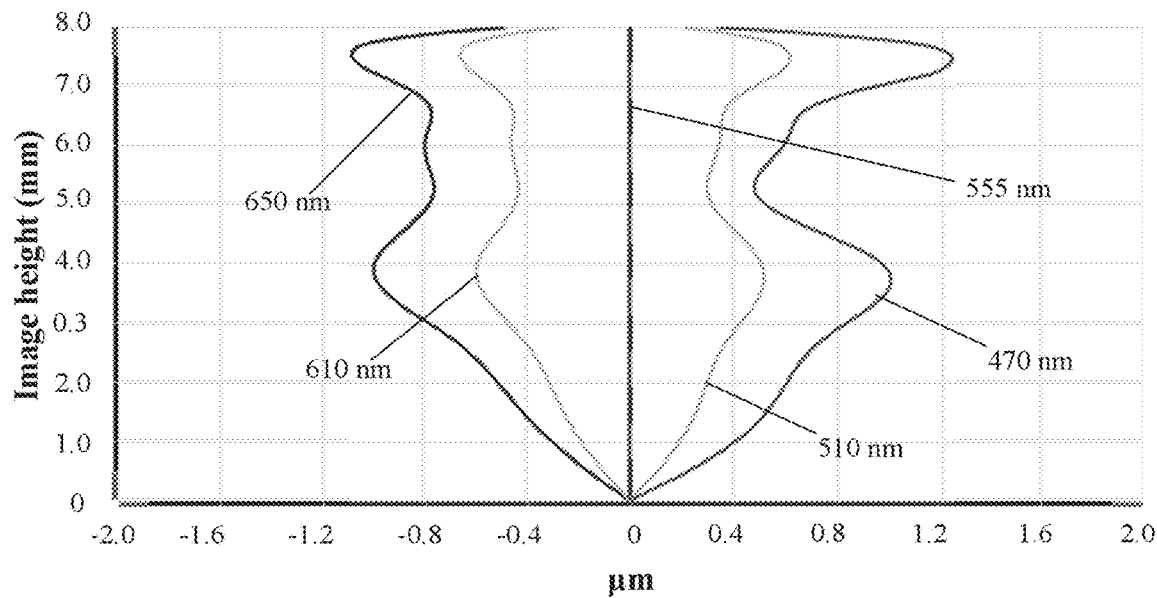
FIG. 3 is a schematic diagram of a lateral color of the camera optical lens shown in FIG. 1.
Figure 4:
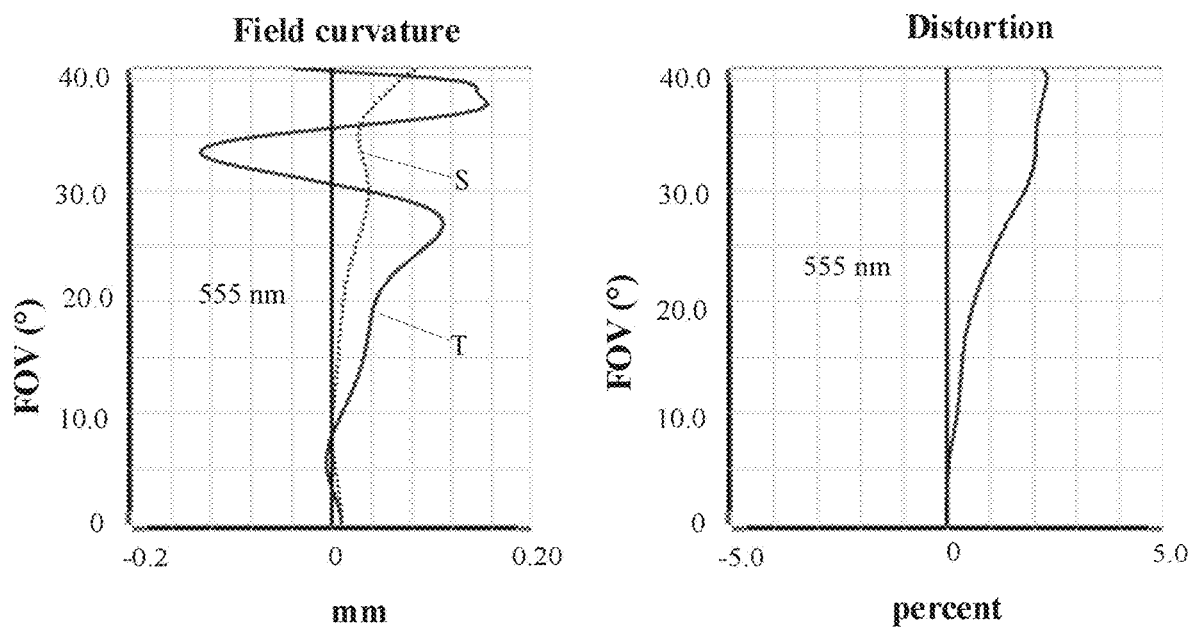
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm and 470 nm after passing the camera optical lens 10 according to Embodiment 1, respectively. FIG. 4 illustrates a field curvature and a distortion of light with a wavelength of 555 nm after passing the camera optical lens 10 according to Embodiment 1. A field curvature S in FIG. 4 is a field curvature in a sagittal direction, and T is a field curvature in a tangential direction.

In this embodiment, an entrance pupil diameter of the camera optical lens 10 is 4.677 mm, an image height of 1.0H is 8.000 mm, a FOV (field of view) in a diagonal direction is 80.00°. Thus, the camera optical lens has a wide-angle and is ultra-thin. Its on-axis and off-axis aberrations are fully corrected, thereby achieving excellent optical characteristics.

Embodiment 2

Figure 5:
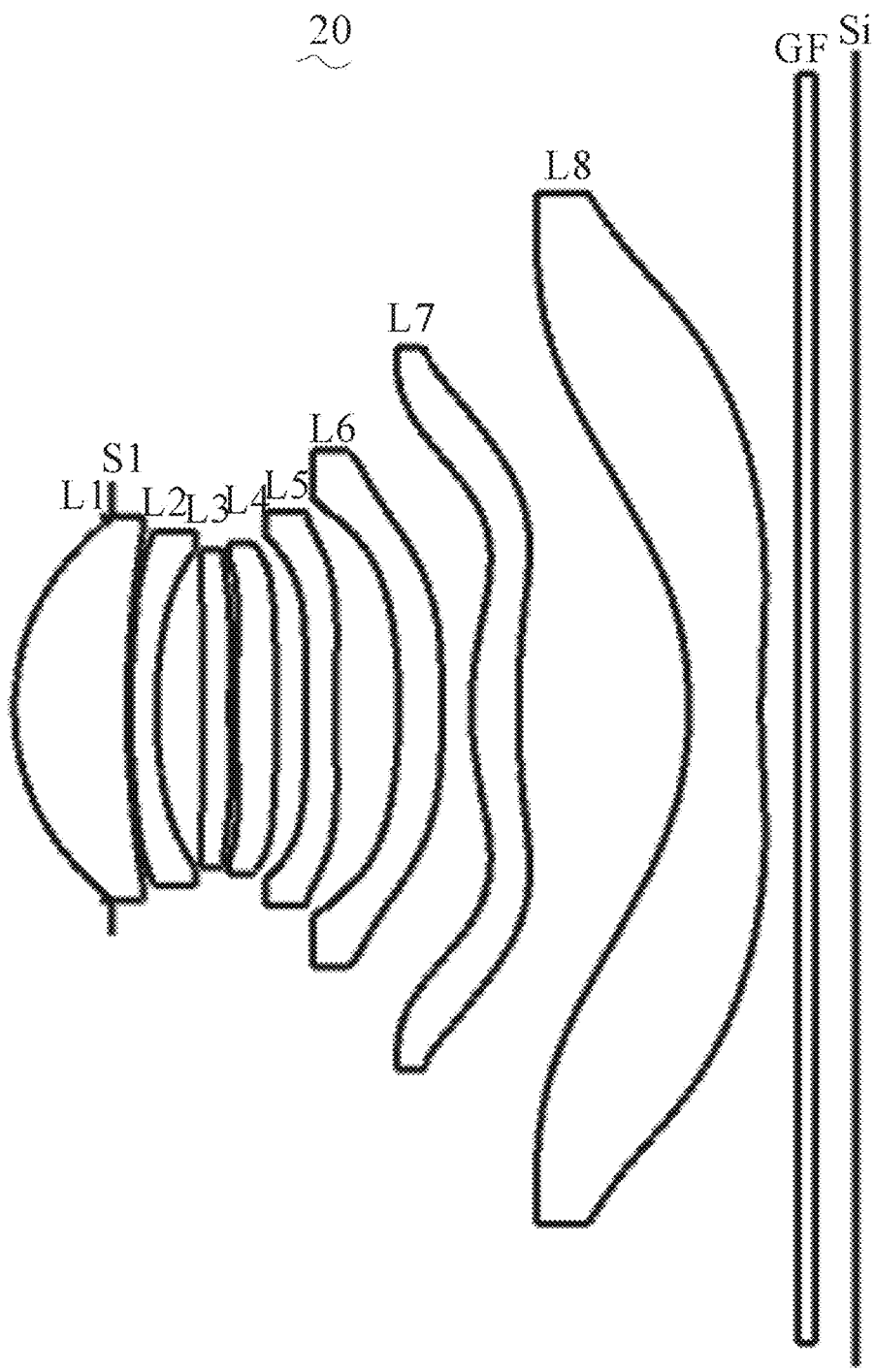
FIG. 5 is a schematic diagram of a structure of a camera optical lens according to Embodiment 2 of the present disclosure.

FIG. 5 is a schematic diagram of a structure of a camera optical lens 20 according to Embodiment 2 of the present disclosure. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | nd | vd |
|---|---|---|---|---|
| S1 | ∞ | d0 = −1.125 | | |
| R1 | 2.984 | d1 = 1.301 | nd1 1.5444 | v1 55.82 |
| R2 | 9.030 | d2 = 0.039 | | |
| R3 | 9.191 | d3 = 0.300 | nd2 1.6700 | v2 19.39 |
| R4 | 5.940 | d4 = 0.536 | | |
| R5 | 72.273 | d5 = 0.309 | nd3 1.6032 | v3 28.29 |
| R6 | 19.882 | d6 = 0.072 | | |
| R7 | 17.592 | d7 = 0.463 | nd4 1.6032 | v4 28.29 |
| R8 | −44.059 | d8 = 0.338 | | |
| R9 | 33.790 | d9 = 0.350 | nd5 1.6700 | v5 19.39 |
| R10 | 16.609 | d10 = 0.730 | | |
| R11 | −8.943 | d11 = 0.500 | nd6 1.6032 | v6 28.29 |
| R12 | −28.178 | d12 = 0.341 | | |
| R13 | 4.024 | d13 = 0.543 | nd7 1.5661 | v7 37.71 |
| R14 | 14.225 | d14 = 1.965 | | |
| R15 | −5.224 | d15 = 0.836 | nd8 1.5346 | v8 55.70 |
| R16 | 10.817 | d16 = 0.430 | | |
| R17 | ∞ | d17 = 0.210 | ndg 1.5168 | vg 64.17 |
| R18 | ∞ | d18 = 0.454 | | |

TABLE 6

| | Conic coefficient | Aspheric surface coefficients | | | |
|---|---|---|---|---|---|
| | k | A4 | A6 | A8 | A10 |
| R1 | −3.9941E−03 | 5.1344E−04 | −1.4412E−04 | 3.1253E−04 | −2.3031E−04 |
| R2 | −8.8294E+00 | −2.0941E−02 | 1.3793E−02 | −4.7704E−03 | 8.7584E−04 |
| R3 | −1.7438E+00 | −2.1914E−02 | 1.5470E−02 | −5.0207E−03 | 7.4360E−04 |
| R4 | −8.7498E+00 | 2.2621E−03 | 6.7936E−03 | −4.9762E−03 | 4.9123E−03 |
| R5 | 1.0000E+01 | −1.3564E−02 | 4.2144E−03 | −2.9359E−03 | 3.0800E−03 |
| R6 | −1.0000E+01 | −2.3452E−02 | 3.9541E−03 | −2.7722E−03 | 2.3278E−03 |
| R7 | 5.6827E+01 | −1.1993E−02 | 2.2233E−03 | −5.5088E−03 | 4.4339E−03 |
| R8 | −9.0000E+01 | −3.0550E−03 | −1.7766E−03 | 2.7080E−03 | −3.4268E−03 |
| R9 | −1.0000E+01 | −2.3298E−02 | −3.6804E−03 | 4.5526E−03 | −3.0229E−03 |
| R10 | −2.8551E+00 | −1.8017E−02 | −2.6667E−03 | 2.8026E−03 | −1.6685E−03 |
| R11 | 7.4010E+00 | −1.0350E−02 | 2.3735E−03 | −1.2349E−03 | 4.9952E−03 |
| R12 | 1.0000E+01 | −3.7239E−02 | 9.0368E−03 | −2.1092E−03 | 4.0326E−04 |
| R13 | −6.0379E+00 | −7.1497E−03 | −8.6670E−04 | −2.2495E−04 | 4.4869E−05 |
| R14 | −9.6907E+00 | 1.4858E−02 | −6.0917E−03 | 6.5570E−04 | −1.1787E−05 |
| R15 | −1.8126E+01 | −2.3857E−02 | 4.5763E−03 | −5.0624E−04 | 3.5954E−05 |
| R16 | −1.0280E+01 | −1.4297E−02 | 1.8068E−03 | −1.5684E−04 | 8.9216E−06 |

| | Aspheric surface coefficients | | | | |
|---|---|---|---|---|---|
| | A12 | A14 | A16 | A18 | A20 |
| R1 | 9.9341E−05 | −2.4304E−05 | 3.1451E−06 | −1.7329E−07 | 0.0000E+00 |
| R2 | −5.8341E−05 | −4.0324E−06 | 5.4015E−07 | 0.0000E+00 | 0.0000E+00 |
| R3 | 2.0749E−05 | −1.7310E−05 | 1.2557E−06 | 0.0000E+00 | 0.0000E+00 |
| R4 | −4.0334E−03 | 2.1489E−03 | −6.7835E−04 | 1.1655E−04 | −8.4217E−06 |
| R5 | −2.4289E−03 | 1.2842E−03 | −4.1546E−04 | 7.4806E−05 | −5.7018E−06 |
| R6 | −1.0158E−03 | 2.2681E−04 | −1.9282E−05 | 0.0000E+00 | 0.0000E+00 |
| R7 | −1.9385E−03 | 4.2862E−04 | −3.8240E−05 | 0.0000E+00 | 0.0000E+00 |
| R8 | 2.1896E−03 | −8.4834E−04 | 1.9187E−04 | −2.2983E−05 | 1.0914E−06 |

TABLE 6-continued

| R9 | 1.1356E−03 | −2.0535E−04 | −5.9115E−06 | 7.8832E−06 | −8.1357E−07 |
|---|---|---|---|---|---|
| R10 | 6.2665E−04 | −1.4556E−04 | 1.8498E−05 | −9.4396E−07 | 0.0000E+00 |
| R11 | −2.5784E−04 | 8.7956E−05 | −1.6642E−05 | 1.5915E−06 | −5.9000E−08 |
| R12 | −8.3167E−05 | 1.6700E−05 | −2.0874E−06 | 1.3294E−06 | −3.3504E−09 |
| R13 | −1.4735E−06 | −1.1522E−07 | 9.3027E−09 | −2.0901E−10 | 1.0322E−12 |
| R14 | −5.4748E−06 | 7.5392E−07 | −4.7067E−08 | 1.4711E−09 | −1.8459E−11 |
| R15 | −1.6571E−06 | 4.9219E−08 | −9.0899E−10 | 9.4901E−12 | −4.2742E−14 |
| R16 | −3.2061E−07 | 6.5554E−09 | −5.5090E−11 | −2.3803E−13 | 5.2012E−15 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 1 | 2.295 | | |
| P1R2 | 1 | 2.005 | | |
| P2R1 | | | | |
| P2R2 | 1 | 1.865 | | |
| P3R1 | 3 | 0.305 | 1.415 | 1.875 |
| P3R2 | 2 | 0.445 | 1.585 | |
| P4R1 | 1 | 0.665 | | |
| P4R2 | | | | |
| P5R1 | 1 | 0.325 | | |
| P5R2 | 2 | 0.515 | 2.105 | |
| P6R1 | 1 | 2.425 | | |
| P6R2 | 2 | 2.315 | 2.825 | |
| P7R1 | 2 | 1.105 | 3.045 | |
| P7R2 | 2 | 1.315 | 3.905 | |
| P8R1 | 1 | 2.885 | | |
| P8R2 | 2 | 0.785 | 5.275 | |

TABLE 8

| | Number of arrest points | Arrest point position 1 | Arrest point position 2 |
|---|---|---|---|
| P1R1 | | | |
| P1R2 | | | |
| P2R1 | | | |
| P2R2 | | | |
| P3R1 | 2 | 0.535 | 1.685 |
| P3R2 | 1 | 0.775 | |
| P4R1 | 1 | 1.095 | |
| P4R2 | | | |
| P5R1 | 1 | 0.555 | |
| P5R2 | 1 | 0.885 | |
| P6R1 | | | |
| P6R2 | | | |
| P7R1 | 1 | 1.825 | |
| P7R2 | 1 | 1.945 | |
| P8R1 | 1 | 5.905 | |
| P8R2 | 1 | 1.485 | |

In addition, Table 13 in the following shows various values of Embodiments 2 and values corresponding to parameters which are specified in the above conditions.

Figure 6:
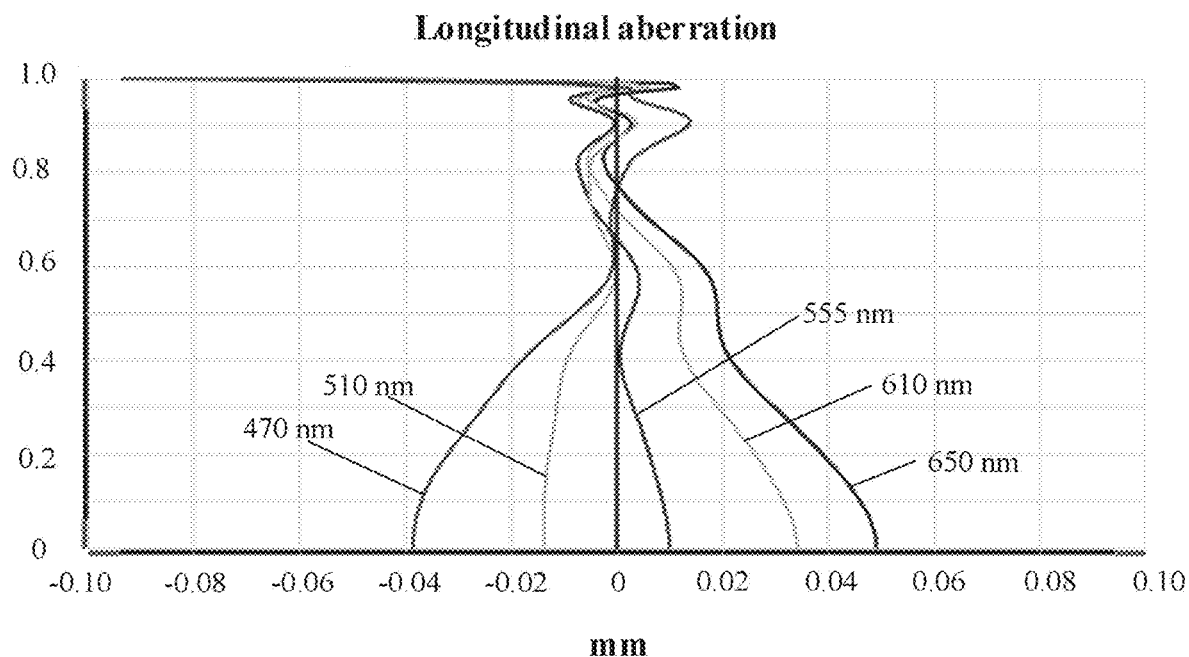
FIG. 6 is a schematic diagram of a longitudinal aberration of the camera optical lens shown in FIG. 5.
Figure 7:
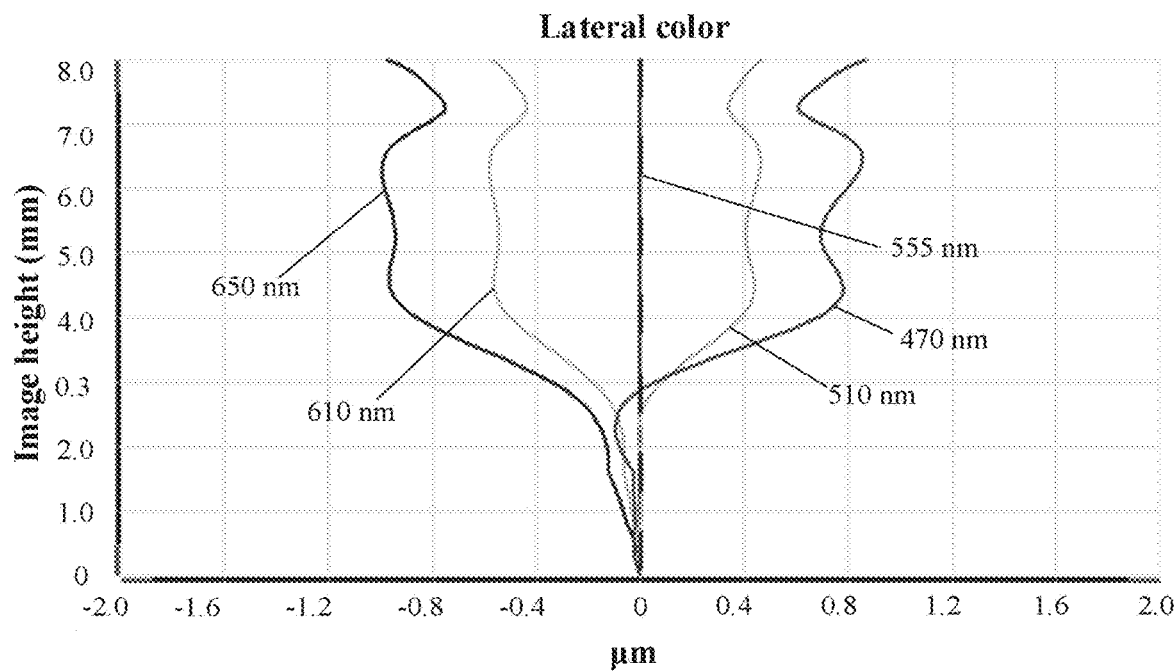
FIG. 7 is a schematic diagram of a lateral color of the camera optical lens shown in FIG. 5.
Figure 8:
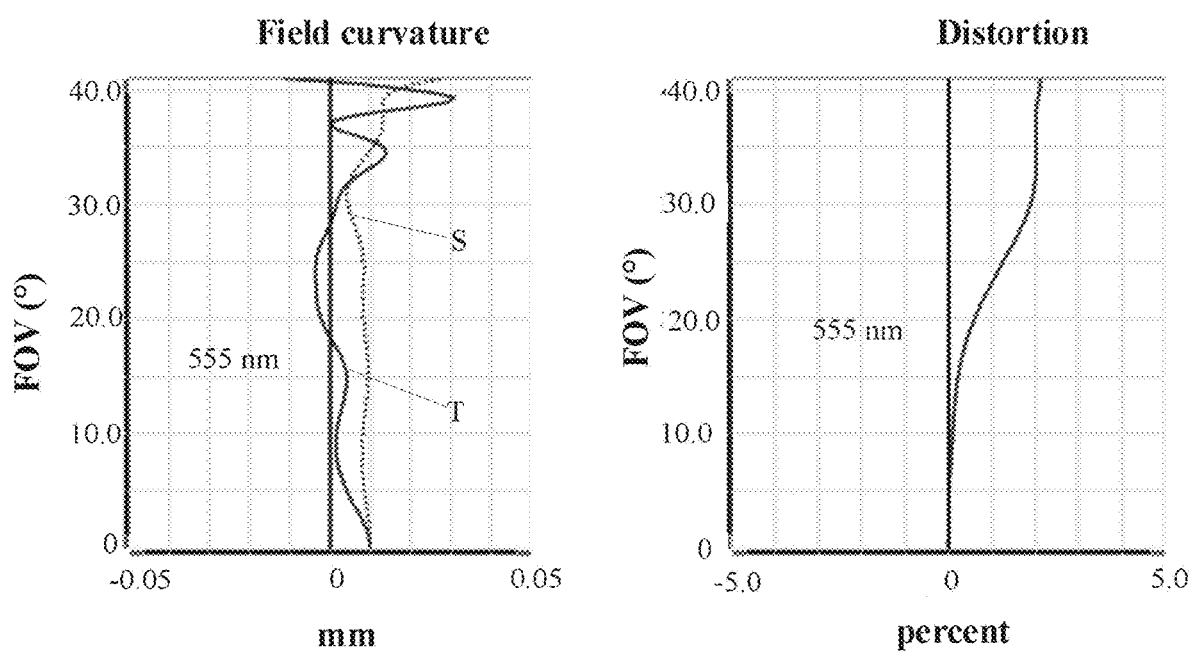
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm and 470 nm after passing the camera optical lens 20 according to Embodiment 2. FIG. 8 illustrates a field curvature and a distortion of light with a wavelength of 555 nm after passing the camera optical lens 20 according to Embodiment 2. A field curvature S in FIG. 8 is a field curvature in a sagittal direction, and T is a field curvature in a tangential direction.

In this embodiment, an entrance pupil diameter of the camera optical lens 20 is 4.643 mm, an image height of 1.0H is 8.000 mm, a FOV (field of view) in the diagonal direction is 80.00°. Thus, the camera optical lens has a wide-angle and is ultra-thin. Its on-axis and off-axis aberrations are fully corrected, thereby achieving excellent optical characteristics.

Embodiment 3

Figure 9:
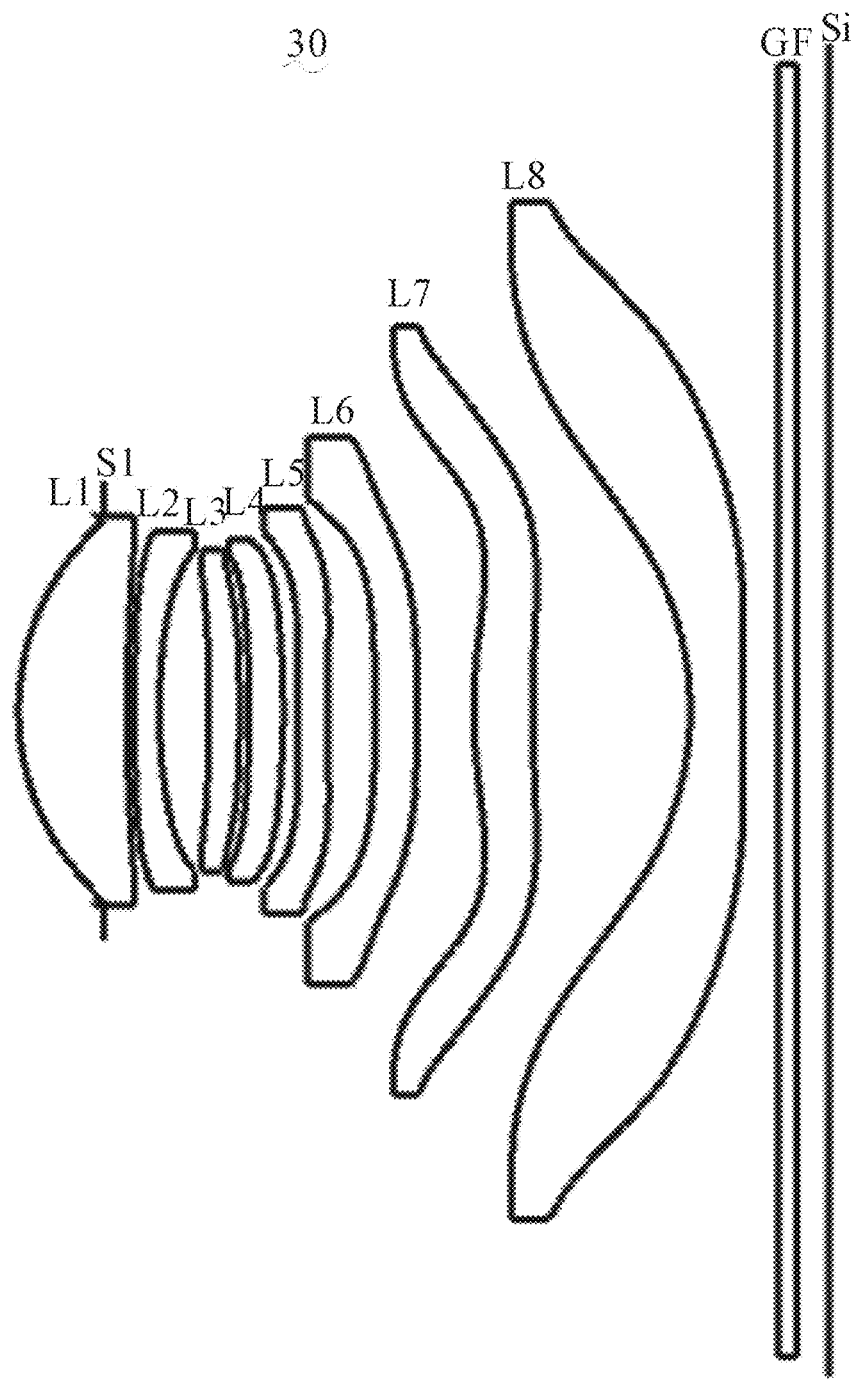
FIG. 9 is a schematic diagram of a structure of a camera optical lens according to Embodiment 3 of the present disclosure.

FIG. 9 is a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

Table 9 and Table 10 show design data of the camera optical lens 30 in Embodiment 3 of the present disclosure.

TABLE 9

| | R | d | nd | vd |
|---|---|---|---|---|
| S1 | ∞ | d0 = −1.027 | | |
| R1 | 3.055 | d1 = 1.305 | nd1 1.5444 | v1 55.82 |
| R2 | 38.715 | d2 = 0.085 | | |
| R3 | 65.052 | d3 = 0.300 | nd2 1.6700 | v2 19.39 |
| R4 | 7.773 | d4 = 0.586 | | |
| R5 | −89.187 | d5 = 0.376 | nd3 1.6032 | v3 28.29 |
| R6 | −21.828 | d6 = 0.115 | | |
| R7 | −10.871 | d7 = 0.409 | nd4 1.6032 | v4 28.29 |
| R8 | −7.844 | d8 = 0.177 | | |
| R9 | 1548.069 | d9 = 0.350 | nd5 1.6700 | v5 19.39 |
| R10 | 16.335 | d10 = 0.576 | | |
| R11 | −24.124 | d11 = 0.500 | nd6 1.6032 | v6 28.29 |
| R12 | −77.865 | d12 = 0.679 | | |
| R13 | 5.543 | d13 = 0.712 | nd7 1.5661 | v7 37.71 |
| R14 | 18.468 | d14 = 1.899 | | |
| R15 | −3.827 | d15 = 0.630 | nd8 1.5352 | v8 55.86 |
| R16 | 28.486 | d16 = 0.430 | | |
| R17 | ∞ | d17 = 0.210 | ndg 1.5168 | vg 64.17 |
| R18 | ∞ | d18 = 0.382 | | |

Table 10 shows aspherical surface data of each lens of the camera optical lens 30 in Embodiment 3 of the present disclosure.

TABLE 10

| | Conic coefficient | Aspherical surface coefficients | | | |
|---|---|---|---|---|---|
| | k | A4 | A6 | A8 | A10 |
| R1 | −7.1117E−02 | 3.6995E−04 | 7.8514E−05 | 9.0923E−05 | −8.1290E−05 |
| R2 | −1.0000E+01 | 7.0996E−03 | −4.0906E−03 | 1.8554E−03 | −5.6244E−04 |

TABLE 10-continued

| | | | | |
|---|---|---|---|---|
| R3 | −1.0000E+01 | 1.3920E−02 | −7.6107E−03 | 4.3229E−03 | −1.5099E−03 |
| R4 | −6.1145E+00 | 1.1059E−02 | −1.9928E−03 | −8.3349E−04 | 2.8006E−03 |
| R5 | 1.0000E+01 | −1.1562E−02 | 4.9346E−04 | −1.0041E−03 | 1.3022E−03 |
| R6 | 4.5650E+01 | −2.1038E−03 | −1.1972E−02 | 4.3696E−03 | 4.0856E−04 |
| R7 | −1.0000E+01 | 2.5833E−02 | −2.5445E−02 | 9.7598E−03 | −1.3082E−03 |
| R8 | −6.5598E+01 | 2.5469E−02 | −3.7970E−02 | 3.0206E−02 | −1.7496E−02 |
| R9 | −1.0000E+01 | 1.5262E−02 | −4.3429E−02 | '3.1830E−02 | −1.5145E−02 |
| R10 | −5.6396E+00 | −2.1509E−03 | −1.7976E−02 | 1.1353E−02 | −4.5596E−03 |
| R11 | 1.0000E+01 | −7.5712E−03 | −2.7989E−03 | 1.9219E−03 | −1.0110E−03 |
| R12 | 1.0000E+01 | −2.0294E−02 | 1.6669E−03 | 7.4448E−04 | −4.7720E−04 |
| R13 | −5.3087E+00 | −8.8107E−03 | −2.5619E−03 | 7.6919E−04 | −1.5085E−04 |
| R14 | −2.1000E+01 | 2.7530E−03 | −4.0417E−03 | 8.3373E−04 | −1.1236E−04 |
| R15 | −9.6302E+00 | −2.2188E−02 | 3.1062E−03 | −2.4262E−04 | 1.2761E−05 |
| R16 | 8.9295E+00 | −1.0344E−02 | 4.9967E−04 | 5.3778E−05 | −1.0635E−05 |

| Aspherical surface coefficients | | | | |
|---|---|---|---|---|
| A12 | A14 | A16 | A18 | A20 |
| R1 | 3.3728E−05 | −8.2120E−06 | 1.0537E−06 | −6.4777E−08 | 0.0000E+00 |
| R2 | 1.0265E−04 | −1.0462E−05 | 4.2230E−07 | 0.0000E+00 | 0.0000E+00 |
| R3 | 3.2858E−04 | −3.8140E−05 | 1.7723E−06 | 0.0000E+00 | 0.0000E+00 |
| R4 | −2.2962E−03 | 1.0745E−03 | −3.0169E−04 | 4.7725E−05 | −3.2553E−06 |
| R5 | −7.3004E−04 | 3.2021E−04 | −1.0226E−04 | 1.9533E−05 | −1.5647E−06 |
| R6 | −6.1749E−04 | 1.5010E−04 | −1.1567E−05 | 0.0000E+00 | 0.0000E+00 |
| R7 | −4.0850E−04 | 1.5693E−04 | −1.4978E−05 | 0.0000E+00 | 0.0000E+00 |
| R8 | 7.2195E−03 | −2.0808E−03 | 3.8355E−04 | −3.9477E−05 | 1.6848E−06 |
| R9 | 4.7674E−03 | −9.1870E−04 | 7.8801E−05 | 2.5774E−06 | −6.7798E−07 |
| R10 | 1.2402E−03 | −2.2236E−04 | 2.3205E−05 | −1.0285E−06 | 0.0000E+00 |
| R11 | 2.9122E−04 | −4.8246E−05 | 4.6295E−06 | −2.7711E−07 | 1.0355E−08 |
| R12 | 1.2409E−04 | −1.6847E−05 | 1.2466E−06 | −4.7435E−08 | 7.1502E−10 |
| R13 | 1.8767E−05 | −1.3592E−06 | 5.5957E−08 | −1.2185E−09 | 1.0896E−11 |
| R14 | 1.0171E−05 | −5.7211E−07 | 1.8416E−08 | −2.9460E−10 | 1.6029E−12 |
| R15 | −4.4765E−07 | 9.7004E−09 | −1.0861E−10 | 2.5893E−13 | 3.7171E−15 |
| R16 | 8.0069E−07 | −3.3981E−08 | 8.4449E−10 | −1.1400E−11 | 6.4332E−14 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 2.185 | | |
| P1R2 | 1 | 1.765 | | |
| P2R1 | | | | |
| P2R2 | | | | |
| P3R1 | 1 | 1.505 | | |
| P3R2 | 1 | 1.655 | | |
| P4R1 | | | | |
| P4R2 | | | | |
| P5R1 | 1 | 0.435 | | |
| P5R2 | 2 | 0.625 | 2.145 | |
| P6R1 | 1 | 2.485 | | |
| P6R2 | 2 | 2.345 | 2.835 | |
| P7R1 | 3 | 0.995 | 3.105 | 4.375 |
| P7R2 | 3 | 1.005 | 4.035 | 4.605 |
| P8R1 | 1 | 2.735 | | |
| P8R2 | 2 | 0.545 | 5.185 | |

TABLE 12

| | Number of arrest points | Arrest point position 1 |
|---|---|---|
| P1R1 | | |
| P1R2 | 1 | 2.175 |
| P2R1 | | |
| P2R2 | | |
| P3R1 | 1 | 1.805 |
| P3R2 | | |
| P4R1 | | |
| P4R2 | | |
| P5R1 | 1 | 0.575 |
| P5R2 | 1 | 1.015 |
| P6R1 | | |
| P6R2 | | |
| P7R1 | 1 | 1.705 |
| P7R2 | 1 | 1.555 |
| P8R1 | 1 | 5.815 |
| P8R2 | 1 | 0.955 |

In addition, Table 13 in the following shows various values of Embodiments 3 and values corresponding to parameters which are specified in the above conditions.

Figure 10:
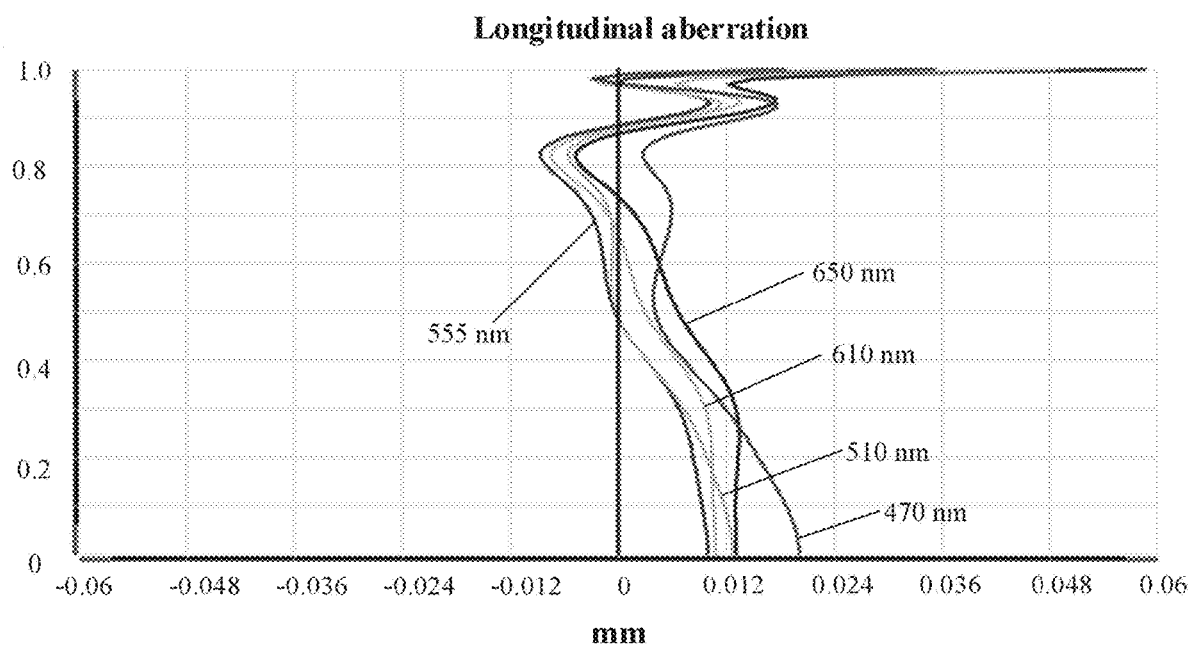
FIG. 10 is a schematic diagram of a longitudinal aberration of the camera optical lens shown in FIG. 9.
Figure 11:
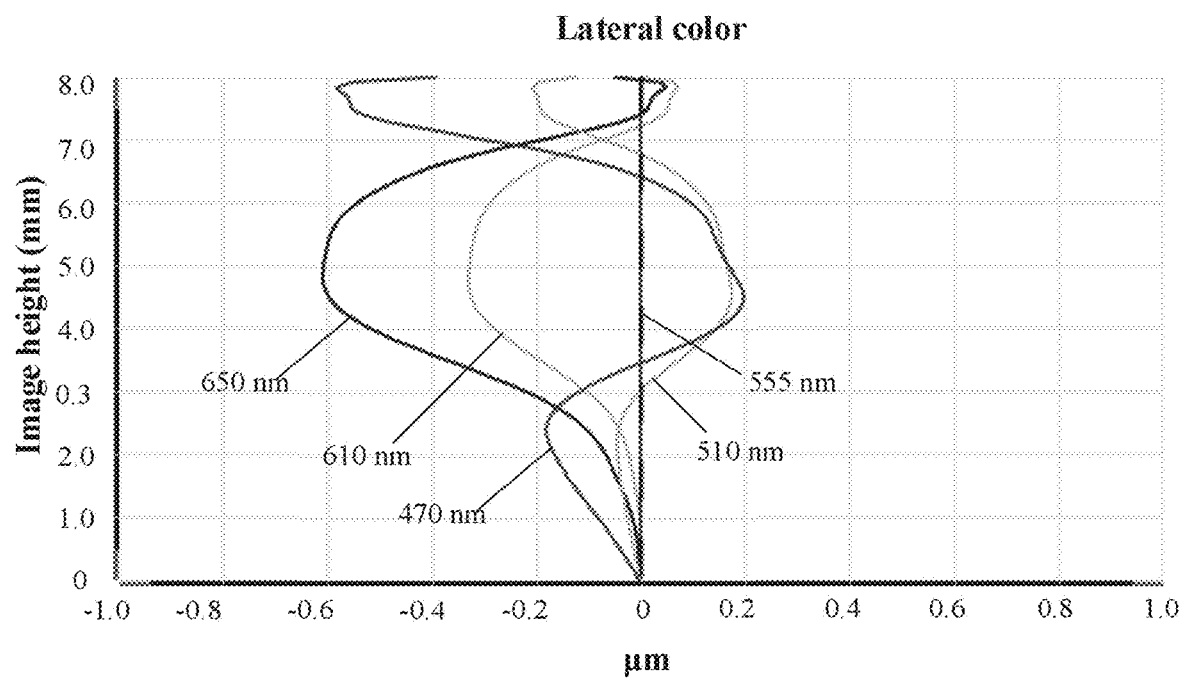
FIG. 11 is a schematic diagram of a lateral color of the camera optical lens shown in FIG. 9.
Figure 12:
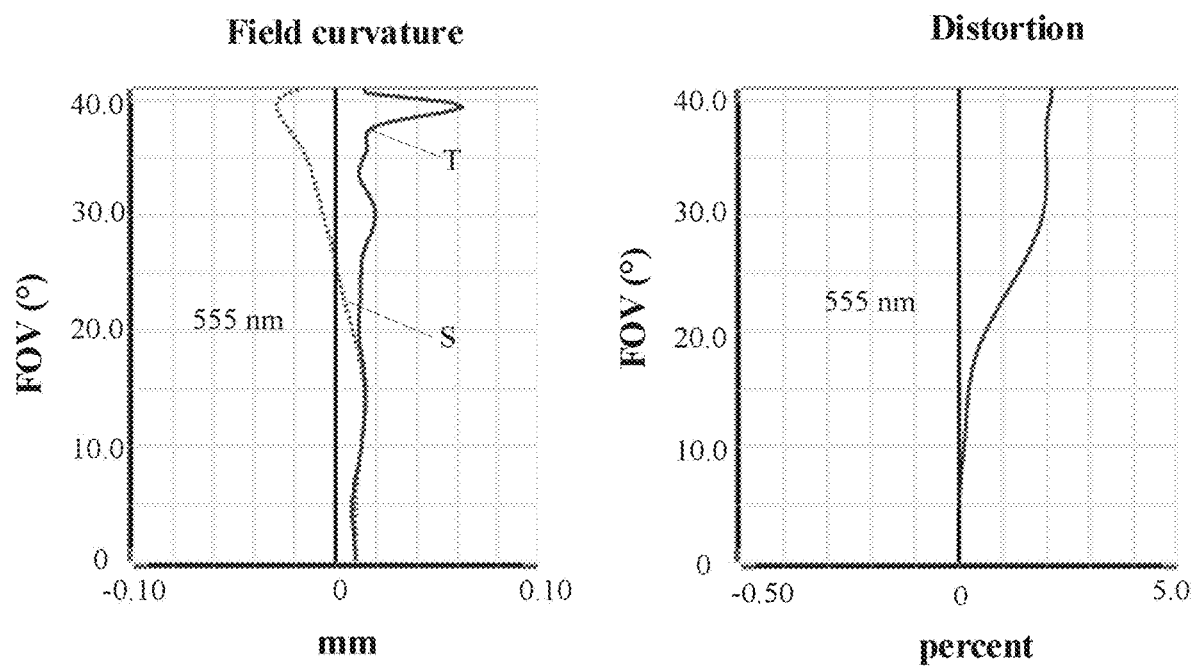
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30 according to Embodiment 3. FIG. 12 illustrates a field curvature and a distortion of light with a wavelength of 555 nm after passing the camera optical lens 30 according to Embodiment 3. A field curvature S in FIG. 12 is a field curvature in a sagittal direction, and T is a field curvature in a tangential direction.

In this embodiment, an entrance pupil diameter of the camera optical lens 30 is 4.679 mm, an image height of 1.0H is 8.000 mm, a FOV (field of view) in the diagonal direction is 80.00°. Thus, the camera optical lens has a wide-angle and is ultra-thin. Its on-axis and off-axis aberrations are fully corrected, thereby achieving excellent optical characteristics.

Table 13 in the following lists values corresponding to the respective conditions in an embodiment according to the above conditions. Obviously, the embodiment satisfies the above conditions.

TABLE 13

| Parameters and conditions | Embodiment 1 | Embodiment 2 | Embodiment 3 |
|---|---|---|---|
| f1/f | 0.74 | 0.84 | 0.66 |
| f4/f | 2.85 | 2.30 | 4.89 |
| f5/f | −3.31 | −5.39 | −2.70 |
| f | 9.026 | 9.030 | 9.031 |
| f1 | 6.695 | 7.585 | 5.996 |
| f2 | −18.722 | −25.789 | −13.082 |
| f3 | −163.101 | −45.283 | 47.511 |
| f4 | 25.760 | 20.769 | 44.159 |
| f5 | −29.840 | −48.708 | −24.417 |
| f6 | −49.658 | −21.794 | −57.780 |
| f7 | 14.340 | 9.678 | 13.650 |
| f8 | −7.376 | −6.451 | −6.241 |
| f12 | 9.277 | 9.812 | 9.474 |
| FNO | 1.93 | 1.95 | 1.93 |

The above are only embodiments of the present disclosure. It shall be indicated that those of ordinary skill in the art can make improvements without departing from the creative concept of the present disclosure, and these belong to the protection scope of the present disclosure.

What is claimed is:

1. A camera optical lens comprising, from an object side to an image side:
   a first lens having a positive refractive power;
   a second lens having a negative refractive power;
   a third lens;
   a fourth lens having a positive refractive power;
   a fifth lens having a negative refractive power;
   a sixth lens having a negative refractive power;
   a seventh lens having a positive refractive power; and
   a eighth lens having a negative refractive power;
   wherein the camera optical lens satisfies following conditions:

$0.65 \leq f1/f \leq 0.85;$ $2.00 \leq f4/f \leq 5.00;$ and $-5.50 \leq f5/f \leq -2.50;$ where
   f denotes a focal length of the camera optical lens;
   f1 denotes a focal length of the first lens;
   f4 denotes a focal length of the fourth lens; and
   f5 denotes a focal length of the fifth lens.

2. The camera optical lens according to claim 1 further satisfying the following condition:

$-5.00 \leq (R13+R14)/(R13-R14) \leq -1.00;$ where
   R13 denotes a curvature radius of an object-side surface of the seventh lens; and
   R14 denotes a curvature radius of an image-side surface of the seventh lens.

3. The camera optical lens according to claim 1 further satisfying the following condition:

$1.50 \leq d10/d9 \leq 2.50;$ where
   d9 denotes an on-axis thickness of the fifth lens; and
   d10 denotes an on-axis distance from an image-side surface of the fifth lens to an object-side surface of the sixth lens.

4. The camera optical lens according to claim 1 further satisfying the following conditions:

$0.07 \leq d1/TTL \leq 0.21;$ and $-3.97 \leq (R1+R2)/(R1-R2) \leq -0.78;$ where
   d1 denotes an on-axis thickness of the first lens;
   TTL denotes a total optical length from an object-side surface of the first lens to an image surface of the camera optical lens along an optical axis;
   R1 denotes a curvature radius of an object-side surface of the first lens; and
   R2 denotes a curvature radius of an image-side surface of the first lens.

5. The camera optical lens according to claim 1 further satisfying the following conditions:

$0.02 \leq d3/TTL \leq 0.05;$ $0.64 \leq (R3+R4)/(R3-R4) \leq 6.98;$ and $-5.71 \leq f2/f \leq -0.97;$ where
   f2 denotes a focal length of the second lens;
   d3 denotes an on-axis thickness of the second lens;
   TTL denotes a total optical length from an object-side surface of the first lens to an image surface of the camera optical lens along an optical axis;
   R3 denotes a curvature radius of an object-side surface of the second lens; and
   R4 denotes a curvature radius of an image-side surface of the second lens.

6. The camera optical lens according to claim 1 further satisfying the following conditions:

$0.02 \leq d5/TTL \leq 0.06;$ $-2.74 \leq (R5+R6)/(R5-R6) \leq 2.64;$ and $-36.14 \leq f3/f \leq 7.89;$ where
   f3 denotes a focal length of the third lens;
   d5 denotes an on-axis thickness of the third lens;
   TTL denotes a total optical length from an object-side surface of the first lens to an image surface of the camera optical lens along an optical axis;
   R5 denotes a curvature radius of an object-side surface of the third lens; and
   R6 denotes a curvature radius of an image-side surface of the third lens.

7. The camera optical lens according to claim 1 further satisfying the following conditions:

$0.02 \leq d7/TTL \leq 0.07;$ and $-0.86 \leq (R7+R8)/(R7-R8) \leq 9.27;$ where
   d7 denotes an on-axis thickness of the fourth lens;
   TTL denotes a total optical length from an object-side surface of the first lens to an image surface of the camera optical lens along an optical axis;
   R7 denotes a curvature radius of an object-side surface of the fourth lens; and
   R8 denotes a curvature radius of an image-side surface of the fourth lens.

8. The camera optical lens according to claim 1 further satisfying the following conditions:

$$0.02 \leq d9/TTL \leq 0.05; \text{ and}$$

$$-3.80 \leq (R9+R10)/(R9-R10) \leq 40.40;$$

where
d9 denotes an on-axis thickness of the fifth lens;
TTL denotes a total optical length from an object-side surface of the first lens to an image surface of the camera optical lens along an optical axis;
R9 denotes a curvature radius of an object-side surface of the fifth lens; and
R10 denotes a curvature radius of an image-side surface of the fifth lens.

9. The camera optical lens according to claim 1 further satisfying the following conditions:

$$0.03 \leq d11/TTL \leq 0.08;$$

$$-11.91 \leq (R11+R12)/(R11-R12) \leq -1.27; \text{ and}$$

$$-12.80 \leq f6/f \leq -1.61;$$

where
f6 denotes a focal length of the sixth lens;
d11 denotes an on-axis thickness of the sixth lens;
TTL denotes a total optical length from an object-side surface of the first lens to an image surface of the camera optical lens along an optical axis;
R11 denotes a curvature radius of an object-side surface of the sixth lens; and
R12 denotes a curvature radius of an image-side surface of the sixth lens.

10. The camera optical lens according to claim 1 further satisfying the following conditions:

$$0.03 \leq d13/TTL \leq 0.11; \text{ and}$$

$$0.54 \leq f7/f \leq 2.38;$$

where
f7 denotes a focal length of the seventh lens;
d13 denotes an on-axis thickness of the seventh lens; and
TTL denotes a total optical length from an object-side surface of the first lens to an image surface of the camera optical lens along an optical axis.

11. The camera optical lens according to claim 1 further satisfying the following conditions:

$$0.03 \leq d15/TTL \leq 0.13;$$

$$-1.53 \leq (R15+R16)/(R15-R16) \leq -0.23; \text{ and}$$

$$-1.63 \leq f8/f \leq -0.46;$$

where
f8 denotes a focal length of the eighth lens;
d15 denotes an on-axis thickness of the eighth lens;
TTL denotes a total optical length from an object-side surface of the first lens to an image surface of the camera optical lens along an optical axis;
R15 denotes a curvature radius of an object-side surface of the eighth lens; and
R16 denotes a curvature radius of an image-side surface of the eighth lens.

* * * * *